Aug. 16, 1938.    W. T. MURDEN    2,126,912
ANTIFRICTION BEARING AND ITS MANUFACTURE
Filed Dec. 6, 1934    3 Sheets-Sheet 1

INVENTOR:
WILLIAM T. MURDEN,
BY
HIS ATTORNEY.

Aug. 16, 1938.    W. T. MURDEN    2,126,912
ANTIFRICTION BEARING AND ITS MANUFACTURE
Filed Dec. 6, 1934    3 Sheets-Sheet 2

INVENTOR:
WILLIAM T. MURDEN,
BY
HIS ATTORNEY.

Aug. 16, 1938.  W. T. MURDEN  2,126,912
ANTIFRICTION BEARING AND ITS MANUFACTURE
Filed Dec. 6, 1934   3 Sheets-Sheet 3
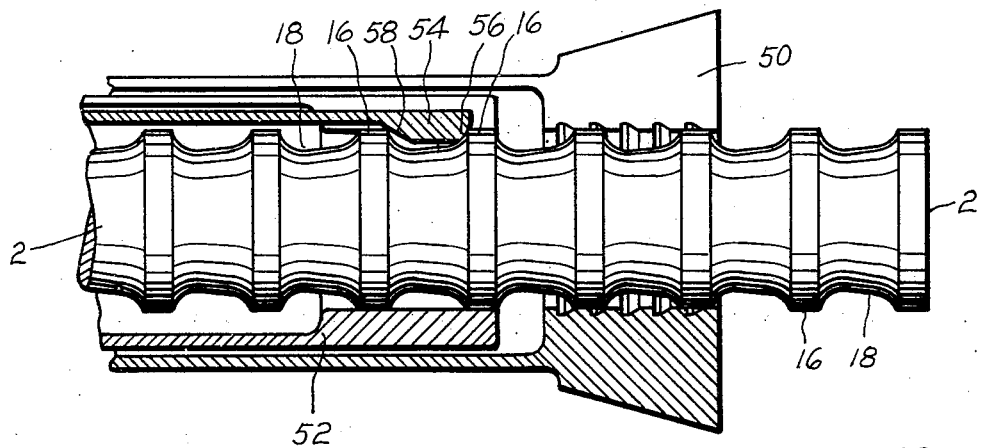
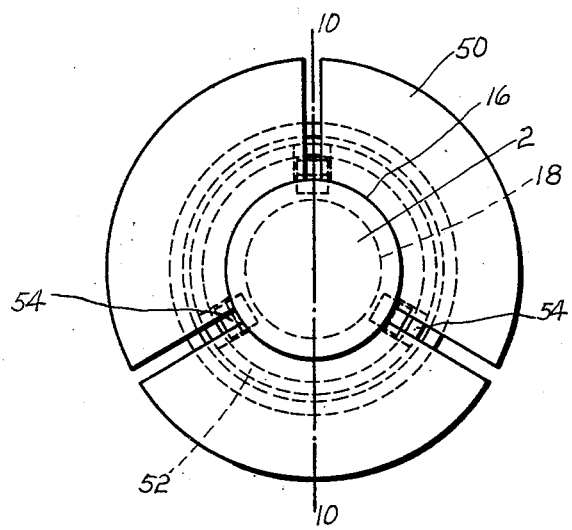
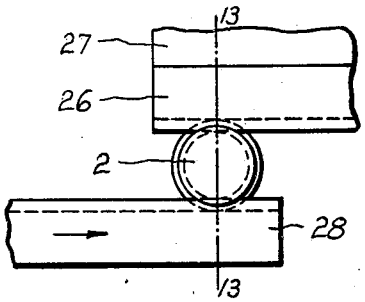
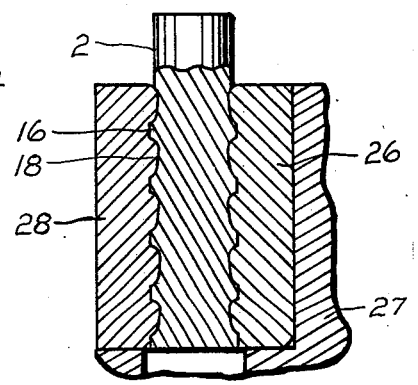
INVENTOR:
WILLIAM T. MURDEN,
BY
HIS ATTORNEY.

Patented Aug. 16, 1938

2,126,912

UNITED STATES PATENT OFFICE 2,126,912

ANTIFRICTION BEARING AND ITS MANUFACTURE

William T. Murden, Bristol, Conn., assignor to General Motors Corporation, Detroit, Mich., a corporation of Delaware Application December 6, 1934, Serial No. 756,302

14 Claims. (Cl. 29—148.4)

This invention relates to antifriction bearings and their manufacture and comprises all of the features and aspects of novelty herein disclosed. An object of the invention is to produce a recurring series of bearing race forms or the like having controlled grain flow. Another object is to provide an improved method of manufacturing contoured articles, especially race rings for antifriction bearings such that the benefits of controlled grain flow can be combined with the economy of machining the rings from bar stock. Another object is to provide an improved method of forming bar stock to facilitate machining operations.

To these ends and also to improve generally upon articles and methods of this character, the invention consists in the various matters hereinafter described and claimed. In its broader aspects, the invention is not necessarily limited to the specific construction and steps selected for illustrative purposes in the accompanying drawings in which Fig. 1 is a side view of a portion of an ordinary steel bar with a race ring machined thereon and ready to be cut off.

Fig. 10 is a sectional view on the line 10—10 of Fig. 11, showing a portion of the chucking and indexing apparatus for handling the improved bar stock.

Fig. 11 is an end view of the apparatus of Fig. 10.

Fig. 12 is a plan view of the improved bar in the vertical dies by which it is rolled to form.

Fig. 13 is a vertical sectional view on the line 13—13 of Fig. 12.

Figure 1:
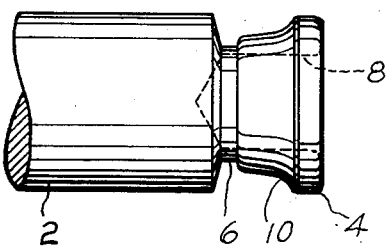
Figure 2:
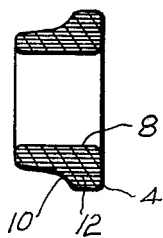
Fig. 2 is a diagram of the race ring cut off and showing the grain flow lines.

In Fig. 1, the numeral 2 indicates a round bar of usual antifriction bearing material on the end of which a race ring 4 is partially machined and ready for cutting off at 6. The bore 8 has been machined out and also a curved raceway 10, the latter being shown as of angular contact type and running up on the shoulder but this is not essential. Such machining is usually performed on an automatic lathe or screw machine which has elements of economy in handling the work but the bar 2 must be of a diameter at least as great as the largest diameter of the finished ring and much of the material must be machined away. As shown in Fig. 2, the ring has longitudinal grain flow lines as indicated at 12 and these lines intersect the curved raceway 10. When rolling elements such as balls run around on such a raceway, the rolling contact is on the ends or edges of these flow lines thus causing an undesired release of the grain structure, and a detrimental flaking of the material.

Figure 3:
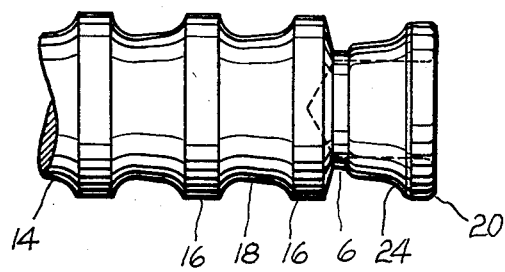
Fig. 3 is a side view of a portion of a rod or bar having recurring race forms rolled therein with one race ring machine.
Figure 4:
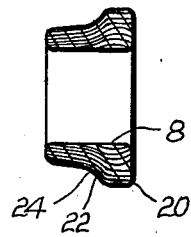
Fig. 4 is a diagram of the race ring cut off and showing the relation of the grain flow to the raceway curvature.
Figure 5:
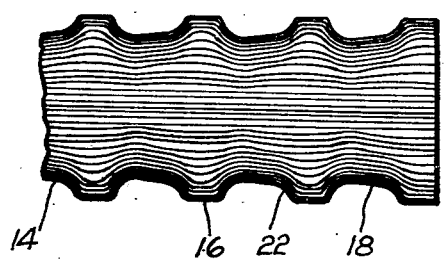
Fig. 5 is a diagram of the grain flow in the improved rolled bar having the recurring race forms.

According to the present invention, race forms are roller in heated bar stock, the forms recurring again and again and with like contours all facing in the same direction. Such a bar is indicated at 14 in Figs. 3 and 5 and comprises the ribs or shoulders 16 and the intervening grooves 18 each of which preferably flares outwardly towards the next outer rib. The adjacent recurring blanks or embryo articles are integrally joined by a strong neck or connecting portion which supports the endmost article for machining, the connecting metal being long enough to afford room for the usual cut-off tool acting in the region indicated by numeral 6 in Fig. 3. When a race ring 20 is machined on the end of the rolled bar, the amount of material removed is much less than in the case of the cylindrical bar of Fig. 1 but still more important is the nature of the grain flow, the flow lines 22 following the contours. Thus, when a curved raceway 24 is machined, the machining is lengthwise of the flow lines and such lines do not intersect the raceway surface but are parallel to it. Thus, at any instant, the bearing balls have contact lengthwise of the lines and not on their ends or edges and a much better wearing surface results.

Any suitable apparatus may be used to roll the bar and one such apparatus is indicated in Figs. 12 and 13. The bar 2 is heated and placed in a vertical position between a fixed die 26, held in a frame 27, and a moving die 28, the dies having ribs and grooves which are contrageneric to those desired in the bar. The stock is initially of a diameter less than the maximum diameter of the work and greater than the minimum diameter thereof. Some portions of the bar are reduced in size and others increased during rolling, thus economizing material as well as lessening subsequent machining. A controlled grain flow following the contours is obtained and the raceways are much improved.

Figure 6:
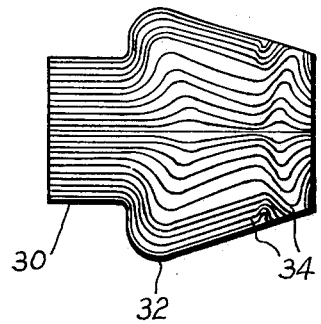
Figs. 6, 7 and 8 are diagrams showing the grain flow lines obtained when a race ring is made by three successive forging operations.
Figure 7:
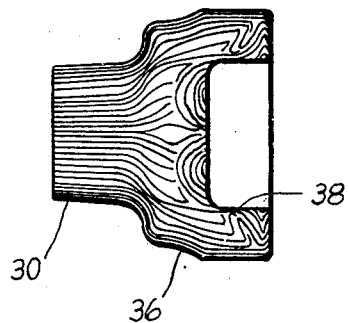
Figure 8:
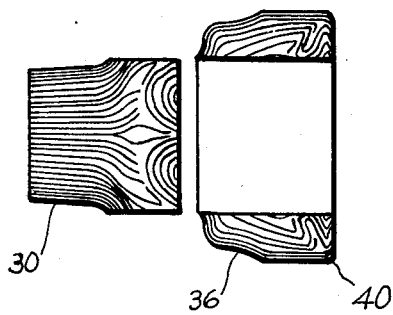
Figure 9:
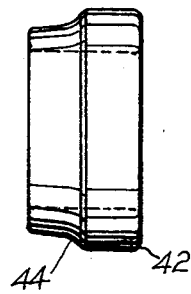
Fig. 9 is a side view of the race ring of Fig. 8 after individual machining.

To make more apparent the place of the present improvement in the art, a brief reference will be made to the forging of race rings as indicated in Figs. 6, 7 and 8. A rod 30 is heated at its end and forged or upset in suitable dies to produce a head 32 like that of Fig. 6 wherein the grain structure may run somewhat as indicated by the lines 34. The hot bar is then presented to other forging dies to produce the shape of Fig. 7 wherein the piece has an embryo race surface 36 and a central recess 38. The bar is then presented to suitable shearing dies and the embryo race ring 40 stripped from the bar as indicated in Fig. 8. Although this forging method increases the density of the material and may have more or less favorable grain flow, there are relatively many operations. Although material is economized by saving the core or center of the piece, nevertheless subsequent completion of the race rings is relatively slow and expensive because of the necessity of chucking the separate pieces individually for machining. The forging method becomes increasingly uneconomical as the size of the work diminishes. The embryo ring of Fig. 8 is not comparable to the ring of Fig. 1 or of Fig. 3, which is machined while on the bar, but such embryo ring is a rough forging and must be chucked and machined as an individual piece, to produce the machined race ring 42 of Fig. 9. In machining the race groove 44 some of the flow lines may be cut across or intersected thus releasing the grain.

An important point to observe is that the applicant's method and product combines the advantages of controlled grain flow with the economy of machining the rings externally while in a recurring series on elongated bar stock. The long bar is merely inserted in an automatic lathe having a chuck and, as the pieces are machined and cut off, the bar is moved forward through the chuck automatically. The improved bar, with rolled-in race curves, actually facilitates the chucking and feeding as compared to a plain round bar, the shoulders or ribs affording opportunity for accurate indexing as will appear from Figs. 10 and 11. Numeral 50 indicates a rotating spring collet chuck which is caused to contract and grip the bar 2 for machining. A slit sleeve 52 carrying spring fingers 54 surrounds the bar and is shiftable longitudinally to feed the bar forward. The spring fingers 54, of which there are preferably three, have terminal abutments 56 which snap in behind one of the ribs 16 and positively prevent retrograde movement of the rod during machining, such tendency to retrograde movement occurring more especially because of the pressure of the end cutting or boring tools. While a race form is being machined and before it is cut off, the sleeve 52 retreats, a cam 58 on each spring finger riding over the next rib 16 and the finger 54 snapping into the next groove 18. The collet 50 then expands and releases the bar 2, and the sleeve 52 advances, the spring finger abutments 56 pushing the bar ahead to just the right position for the machining tools whereupon the collet 50 again contracts and grips the bar. This indexing means, acting on a well defined rib which is only a few race ring spaces from the outer end of the bar and at a definite distance therefrom, is very accurate and reliable as compared to a round bar of indefinite length controlled from the rear end.

I claim:
1. A bar of bearing material having circumferential ribs alternating with grooves, the ribs being equally spaced and the grooves being similarly contoured to form embryo bearing faces having controlled grain flow near the surface; substantially as described.

2. The method of making bearing race rings, which consists in subjecting elongated bar stock to a rolling operation to produce a series of recurring embryo race forms having like contours all facing in the same direction, and thereafter machining the race rings successively while connected to the bar and as said bar is repeatedly advanced; substantially as described.

3. The method of making bearing race rings, which consists in forming on an elongated bar a series of recurring race forms with the grain flow lines paralleling the contour of the raceways and with like contours all facing in the same direction, and machining the raceways while the material is joined to the bar; substantially as described.

4. The method of making contoured articles, which consists in subjecting bar stock to a transverse rolling operation to produce a series of duplicate and repeatedly recurring profiles, and thereafter machining the profiles successively at one loading of the machine with the series of profiles while the latter are still attached to the bar; substantially as described.

5. The method of making contoured articles, which consists in forming on a bar a series of repeatedly recurring and like profiles with the grain flow lines of the material paralleling the profiles, the counterpart profiles all facing in the same direction, and machining the profiles in succession while the latter are connected to the bar; substantially as described.

6. The method of making bearing race rings, which consists in forming on an elongated bar, a series of duplicate race forms recurring again and again along the bar and with like contours all facing in the same direction, successively utilizing race forms, not including the endmost one, to hold the bar while said endmost race form is machined, and successively cutting off the endmost race form from its remaining counterparts on the bar; substantially as described.

7. A rolled article of manufacture consisting of a profiled blank of circular section, the fibers of the metal being approximately parallel with the outer surface of the blank and extending longitudinally thereof.

8. A rolled article of manufacture consisting of a series of identical non-spherical blanks and connecting portions spacing them apart but integrally connecting them in the form of an elongated rod of size and length suitable for workstock in an automatic screw machine and said connecting portions being strong enough to support the endmost blank while undergoing the work of such machine, the individual blanks being approximately of the size and shape of antifriction bearing parts.

9. A rolled article of manufacture consisting of a series of like blanks and connecting portions spacing them apart but integrally connecting same in the form of an elongated rod of size and length suitable for workstock in an automatic screw machine and said connecting portions being strong enough to support the endmost blank while undergoing the work of such machine, said blanks having a portion of the form of a profiled surface of revolution and having the grain of the metal extending substantially in axial planes and parallel with the profiled surface.

10. Rolled screw machine stock consisting of a multiplicity of identical, similarly disposed, blanks of irregular profile and circular section alternating with identical connecting portions integrally connecting successive blanks together in the form of an elongated rod of a size and length suitable for feeding in an automatic screw machine or the like, each connecting portion being strong enough to support the adjacent blank while exposed and undergoing the work of said machine and being long enough to permit a cutting tool to pass between successive blanks in the operation of removing said connecting portion so as to sever the endmost blank from the stock without injury to the blanks.

11. A rolled article of manufacture consisting of a multiplicity of relatively long identical blanks of circular section and irregular profile alternating with relatively short connecting portions of circular section integrally connecting said blanks together in the form of an elongated rod of size and length suitable for workstock in an automatic screw machine and said connecting portions being strong enough to support the endmost blank while undergoing the work of such machine.

12. A rolled article of manufacture consisting of a multiplicity of relatively long identical blanks of circular section and non-spherical surface alternating with relatively short connecting portions integrally connecting said blanks together, said connecting portions being of circular section and adapted to support the endmost blank while undergoing work thereon and long enough to afford room for tools to work on the inner end of said blank.

13. A rolled article of manufacture consisting of a multiplicity of identical similarly disposed blanks of circular section and irregular profile alternating with portions integrally connecting said blanks together into an elongated rod that is adapted for use as work stock in a screw machine, the fibers of the metal being approximately parallel with the outer surfaces of the blanks.

14. The method of making contoured articles, which consists in subjecting bar stock to a rolling operation to produce a series of duplicate and repeatedly recurring profiles, and then supplying the bar to a machine and thereafter machining the profiles successively and while the latter are still attached to the bar and without manual resetting of the bar; substantially as described.

WILLIAM T. MURDEN.